(12) United States Patent
Otomitsu et al.

(10) Patent No.: US 11,054,589 B2
(45) Date of Patent: Jul. 6, 2021

(54) OPTICAL CONNECTOR AND METHOD FOR CONNECTING OPTICAL CONNECTOR

(71) Applicants: Fujikura Ltd., Tokyo (JP); NIPPON TELEGRAPH AND TELEPHONE CORPORATION, Tokyo (JP)

(72) Inventors: Takahito Otomitsu, Chiba (JP); Mitsuru Kihara, Tokyo (JP); Ryo Koyama, Tokyo (JP)

(73) Assignees: Fujikura Ltd., Tokyo (JP); NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/757,676

(22) PCT Filed: Dec. 28, 2017

(86) PCT No.: PCT/JP2017/047361
§ 371 (c)(1),
(2) Date: Apr. 20, 2020

(87) PCT Pub. No.: WO2019/130580
PCT Pub. Date: Jul. 4, 2019

(65) Prior Publication Data
US 2020/0249404 A1     Aug. 6, 2020

(51) Int. Cl.
*G02B 6/40*     (2006.01)
*G02B 6/38*     (2006.01)

(52) U.S. Cl.
CPC .......... *G02B 6/406* (2013.01); *G02B 6/3831* (2013.01); *G02B 6/3853* (2013.01); *G02B 6/3894* (2013.01)

(58) Field of Classification Search
CPC ..... G02B 6/3831; G02B 6/3883; G02B 6/406
See application file for complete search history.

(56) References Cited

U.S. PATENT DOCUMENTS 4,279,469 A     7/1981   Forman
4,699,458 A    10/1987   Ohtsuki et al.
(Continued)

FOREIGN PATENT DOCUMENTS

CN     1316664 A    10/2001
CN     1320827 A    11/2001
(Continued)

OTHER PUBLICATIONS

Notice of Reasons for Refusal issued in corresponding Japanese Patent Application No. 2016-171770, dated Mar. 22, 2018, with translation (10 pages).

*Primary Examiner* — Rhonda S Peace
(74) *Attorney, Agent, or Firm* — Osha Bergman Watanabe & Burton LLP

(57) ABSTRACT

An optical connector includes: an optical receptacle; and an optical plug that is attachable to and detachable from the optical receptacle. The optical receptacle includes receptacle-side connector modules that each include: an outer housing; an inner housing; a receptacle-side ferrule housed in the inner housing; and a receptacle-side spring that applies pressure to the receptacle-side ferrule. The optical plug includes plug-side connector modules that each include: a plug-side housing; a plug-side ferrule housed in the plug-side housing; and a plug-side spring that applies pressure to the plug-side ferrule. The inner housing includes an engagement section. The plug-side housing includes an engaged section.

12 Claims, 11 Drawing Sheets

(56) References Cited

U.S. PATENT DOCUMENTS

| | | | |
|---|---|---|---|
| 5,064,268 A | 11/1991 | Morency et al. | |
| 5,121,454 A * | 6/1992 | Iwano | G02B 6/3807 |
| | | | 385/56 |
| 5,216,732 A * | 6/1993 | Knott | G02B 6/3847 |
| | | | 385/56 |
| 6,315,590 B1 * | 11/2001 | Grois | G02B 6/389 |
| | | | 439/248 |
| 6,364,536 B1 * | 4/2002 | Chen | G02B 6/3825 |
| | | | 385/59 |
| 6,648,520 B2 | 11/2003 | McDonald et al. | |
| 6,776,533 B2 * | 8/2004 | Gherardini | G02B 6/3878 |
| | | | 385/56 |
| 7,972,067 B2 * | 7/2011 | Haley | G02B 6/3879 |
| | | | 385/78 |
| 8,167,638 B2 * | 5/2012 | Wojcik | H01R 13/506 |
| | | | 439/352 |
| 8,579,644 B2 * | 11/2013 | Cole | H01R 13/533 |
| | | | 439/312 |
| 8,628,252 B2 * | 1/2014 | Matsumoto | G02B 6/3879 |
| | | | 385/56 |
| 8,814,441 B2 * | 8/2014 | Strasser | G02B 6/3893 |
| | | | 385/56 |
| 8,920,043 B2 * | 12/2014 | Iwaya | G02B 6/3879 |
| | | | 385/54 |
| 9,400,357 B2 * | 7/2016 | Kato | G02B 6/387 |
| 9,477,049 B2 * | 10/2016 | Gniadek | H01R 13/625 |
| 9,563,027 B2 * | 2/2017 | Childers | G02B 6/4403 |
| 10,396,512 B2 * | 8/2019 | Gniadek | H01R 24/66 |
| 10,670,824 B2 * | 6/2020 | Zimmel | G02B 6/3885 |
| 2010/0215322 A1 | 8/2010 | Matsumoto et al. | |
| 2012/0093462 A1 | 4/2012 | Childers et al. | |
| 2015/0104135 A1 | 4/2015 | Bushnell et al. | |
| 2015/0346438 A1 | 12/2015 | Kato | |
| 2016/0161680 A1 * | 6/2016 | Nguyen | G02B 6/3879 |
| | | | 385/59 |
| 2020/0249404 A1 * | 8/2020 | Otomitsu | G02B 6/3853 |
| 2020/0257064 A1 * | 8/2020 | Otomitsu | G02B 6/40 |

FOREIGN PATENT DOCUMENTS

| | | | | |
|---|---|---|---|---|
| CN | 101006376 A | 7/2007 | | |
| CN | 105899818 A | 8/2016 | | |
| EP | 1172673 A2 * | 1/2002 | | G02B 6/3831 |
| GB | 1450760 A | 9/1976 | | |
| JP | S59136709 A | 8/1984 | | |
| JP | H03172806 A | 7/1991 | | |
| JP | H05021211 U | 3/1993 | | |
| JP | H09311245 A | 12/1997 | | |
| JP | H11052181 A | 2/1999 | | |
| JP | 2000039536 A | 2/2000 | | |
| JP | 2000137142 A | 5/2000 | | |
| JP | 2001313119 A | 11/2001 | | |
| JP | 2002082254 A | 3/2002 | | |
| JP | 2010525385 A | 7/2010 | | |
| JP | 4871862 B2 | 2/2012 | | |
| JP | 2013004281 A | 1/2013 | | |
| JP | 2013152848 A | 8/2013 | | |
| JP | 5690005 B1 | 3/2015 | | |
| JP | 2015227938 A | 12/2015 | | |
| JP | 2017504843 A | 2/2017 | | |

* cited by examiner

OPTICAL CONNECTOR AND METHOD FOR CONNECTING OPTICAL CONNECTOR

TECHNICAL FIELD

The present invention relates to an optical connector and a method for connecting an optical connector.

BACKGROUND

As an example of an optical connector that houses a ferrule in a housing to be retractable, for example, a mechanically transferable (MT) optical connector (F12 optical connector defined by JIS C5981) has been known. In such an optical connector, endfaces of ferrules holding a plurality of optical fibers abut each other, and thus endfaces of the optical fibers physically abut each other, and the optical fibers are optically connected to each other.

PATENT LITERATURE

Patent Literature 1: JP 5690005B
Patent Literature 2: JP 2015-227938A

SUMMARY OF INVENTION

Multicore optical fibers such as 1000-core optical fibers and 2000-core optical fibers, for example, may be optically connected between a station building and a closure outside the station building in a fiber to the home (FTTH) service. Heretofore, in this case, such multicore optical fibers have been split for several bundles and connected by fusion in the closure, and thus a connection operation has been requiring a great amount of time and effort.

When the MT optical connector is used for connection, a push-back amount for one ferrule is limited. Thus, when such multicore optical fibers are collectively connected by a plurality of ferrules, dimensional tolerance between the plurality of ferrules is not negligible. When the push-back amount of the ferrules is absorbed by the dimensional tolerance, an amount of pressure varies for each ferrule, and the push-back amount needs to be set long.

SUMMARY

One or more embodiments of the present invention provide an optical connector capable of collectively connecting a plurality of ferrules that connect high-density multicore optical fibers to each other.

One or more embodiments of the present invention are directed to an optical connector comprising: an optical receptacle and an optical plug configured to be attached and detached, wherein the optical receptacle includes a plurality of receptacle-side connector modules including an outer housing, an inner housing, a receptacle-side ferrule housed in the inner housing, and a receptacle-side spring that applies pressure to the receptacle-side ferrule, the optical plug includes a plurality of plug-side connector modules including a plug-side housing, a plug-side ferrule housed in the plug-side housing, and a plug-side spring that applies pressure to the plug-side ferrule, the inner housing includes an engagement section, the plug-side housing includes an engaged section, and, in a state where the engagement section engages with the engaged section, the inner housing and the plug-side housing have a predetermined positional relationship, and the receptacle-side ferrule and the plug-side ferrule are butting (i.e., abut) against each other with predetermined pressure by the receptacle-side spring and the plug-side spring, the plug-side housing includes an unlocking section, and, when the unlocking section causes an unlocked state from a locked state where the inner housing is locked by the outer housing, the inner housing is made movable with respect to the outer housing, and, when the optical receptacle and the optical plug are connected (i.e., attached) to each other, in a state where the engagement section engages with the engaged section after the locked state shifts to the unlocked state in each of a receptacle-side connector module and a plug-side connector module, the inner housing and the plug-side housing move in a direction of attaching and detaching (an attaching and detaching direction) with respect to the outer housing.

Other features of the invention are made clear by the following description and the drawings.

According to one or more embodiments of the present invention, a plurality of ferrules that connect high-density multicore optical fibers to each other can be collectively connected.

DETAILED DESCRIPTION

Figure 1:
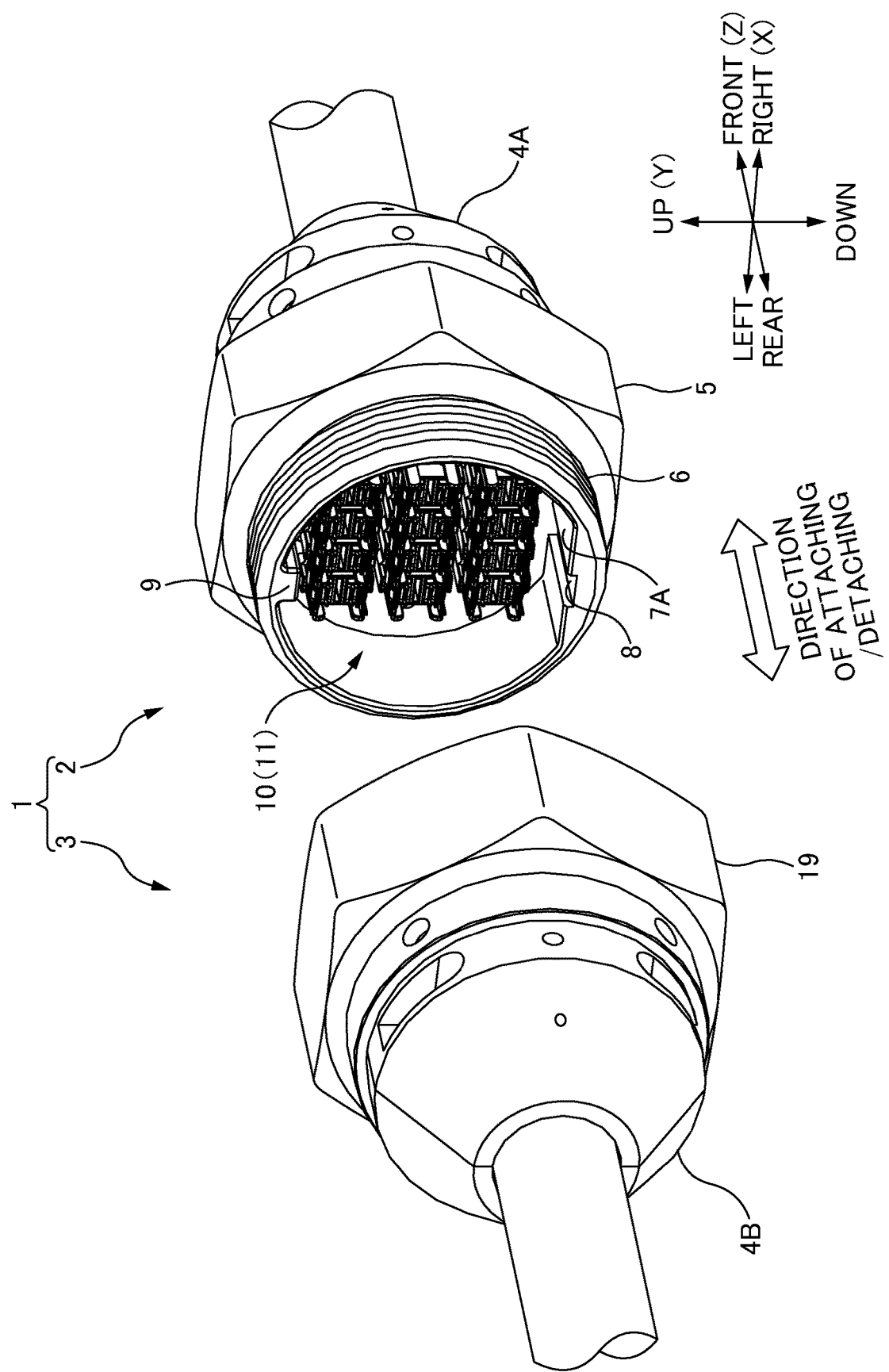
FIG. 1 is a perspective view of an optical connector 1 before an optical receptacle 2 and an optical plug 3 are coupled to each other, in accordance with one or more embodiments.

At least the following matters are made clear from the following description and the drawings.

An optical connector according to one or more embodiments will become clear, comprising: an optical receptacle and an optical plug configured to be attached and detached, wherein the optical receptacle includes a plurality of receptacle-side connector modules including an outer housing, an inner housing, a receptacle-side ferrule housed in the inner housing, and a receptacle-side spring that applies pressure to the receptacle-side ferrule, the optical plug includes a plurality of plug-side connector modules including a plug-side housing, a plug-side ferrule housed in the plug-side housing, and a plug-side spring that applies pressure to the plug-side ferrule, the inner housing includes an engagement section, the plug-side housing includes an engaged section, and, in a state where the engagement section engages with the engaged section, the inner housing and the plug-side housing have a predetermined positional relationship, and the receptacle-side ferrule and the plug-side ferrule are butting against each other with predetermined pressure by the receptacle-side spring and the plug-side spring, the plug-side housing includes an unlocking section, and, when the unlocking section causes an unlocked state from a locked state where the inner housing is locked by the outer housing, the inner housing is made movable with respect to the outer housing, and, when the optical receptacle and the optical plug are connected to each other, in a state where the engagement section engages with the engaged section after the locked state shifts to the unlocked state in each of a receptacle-side connector module and a plug-side connector module, the inner housing and the plug-side housing move in a direction of attaching and detaching with respect to the outer housing. With this optical connector, the plurality of ferrules that connect the high-density multicore optical fibers to each other can be collectively connected.

According to one or more embodiments, the optical receptacle includes a receptacle-side cylindrical part including a screw part (screw) formed on an outer surface, and the optical plug includes a nut part (nut) into which the receptacle-side cylindrical part is screwed, and the locked state shifts to the unlocked state by advancing screwing of the receptacle-side cylindrical part into the nut part. In this way, the connection of the plurality of ferrules that connect the high-density multicore optical fibers to each other can be easily collectively released only by performing a simple operation of an unscrewing operation.

According to one or more embodiments, the optical plug includes a plug-side cylindrical part that fits into the receptacle-side cylindrical part. In this way, rough positioning before fitting of the receptacle-side housing and the plug-side housing can be performed.

According to one or more embodiments, the optical receptacle includes a casing that holds the outer housing, and the outer housing is provided movably in a direction perpendicular to a direction of attaching and detaching with respect to the casing. In this way, relative misalignment between the receptacle-side housing and the plug-side housing during optical connector connection can be absorbed.

According to one or more embodiments, the receptacle-side ferrule and the plug-side ferrule are a lens coupling-type ferrule. In this way, pressure of a spring for elastically biasing the ferrule can be reduced.

A method for connecting an optical connector including an optical receptacle and an optical plug configured to be attached and detached according to one or more embodiments will become clear, wherein the optical receptacle includes a plurality of receptacle-side connector modules including an outer housing, an inner housing, a receptacle-side ferrule housed in the inner housing, and a receptacle-side spring that applies pressure to the receptacle-side ferrule, the optical plug includes a plurality of plug-side connector modules including a plug-side housing, a plug-side ferrule housed in the plug-side housing, and a plug-side spring that applies pressure to the plug-side ferrule, the inner housing includes an engagement section, the plug-side housing includes an engaged section, and, in a state where the engagement section engages with the engaged section, the inner housing and the plug-side housing have a predetermined positional relationship, and the receptacle-side ferrule and the plug-side ferrule are butting against each other with predetermined pressure by the receptacle-side spring and the plug-side spring, the plug-side housing includes an unlocking section, and, when the unlocking section causes an unlocked state from a locked state where the inner housing is locked by the outer housing, the inner housing is made movable with respect to the outer housing, and, when the optical receptacle and the optical plug are connected to each other, in a state where the engagement section engages with the engaged section after the locked state shifts to the unlocked state in each of a receptacle-side connector module and a plug-side connector module, the inner housing and the plug-side housing move in a direction of attaching and detaching with respect to the outer housing. With this method for connecting an optical connector, the plurality of ferrules that connect the high-density multicore optical fibers to each other can be collectively connected.

According to one or more embodiments, the optical receptacle includes a receptacle-side cylindrical part including a screw part formed on an outer surface, and the optical plug includes a plug-side cylindrical part that is housed in and fits into the receptacle-side cylindrical part during connection to the optical receptacle, and a ring-shaped operation section that is rotatably disposed on an outer surface of the plug-side cylindrical part, and is configured to be screw-fixed to the receptacle-side cylindrical part by a screw part formed on an inner surface. In this way, when the plurality of ferrules that connect the high-density multicore optical fibers to each other are collectively connected, rough positioning between the ferrules can be performed.

According to one or more embodiments, a first key projection being a protrusion along a direction of attaching and detaching and a first key recess having a groove shape along the direction of attaching and detaching are formed on an inside of the receptacle-side cylindrical part, and a second key recess that matches the first key projection and has a groove shape along the direction of attaching and detaching and a second key projection that matches the first key recess and is a protrusion along the direction of attaching and detaching are formed on an outside of the plug-side cylindrical part. In this way, the optical plug can be prevented from fitting to the optical receptacle upside down, and thus an operation efficiency of a connection operation improves.

According to one or more embodiments, the first key projection is formed in a position facing the first key recess. In this way, the optical plug can be prevented from fitting to the optical receptacle upside down, and thus the operation efficiency of the connection operation improves.

According to one or more embodiments, the first key recess is formed on a first flat part formed on a part of the inside of the receptacle-side cylindrical part, and the second key projection is formed on a second flat part formed on a part of the plug-side cylindrical part. In this way, the optical plug can be prevented from fitting to the optical receptacle upside down, and thus the operation efficiency of the connection operation improves.

According to one or more embodiments, the optical receptacle includes a casing that includes a grip and an optical fiber holding part, the outer housing includes a pair of flange parts, and the grip and the optical fiber holding part hold the outer housing in the casing so as to sandwich the flange parts from both sides. In this way, the outer housing can be prevented from being detached from the casing on the receptacle side.

According to one or more embodiments, the grip and the ring-shaped operation section include an outer surface formed in a hexagonal prism shape (a hexagonal-prism-shaped outer surface). In this way, clamping torque when the optical receptacle and the optical plug are clamped increases, and the operation efficiency of the connection operation improves.

Figure 2:
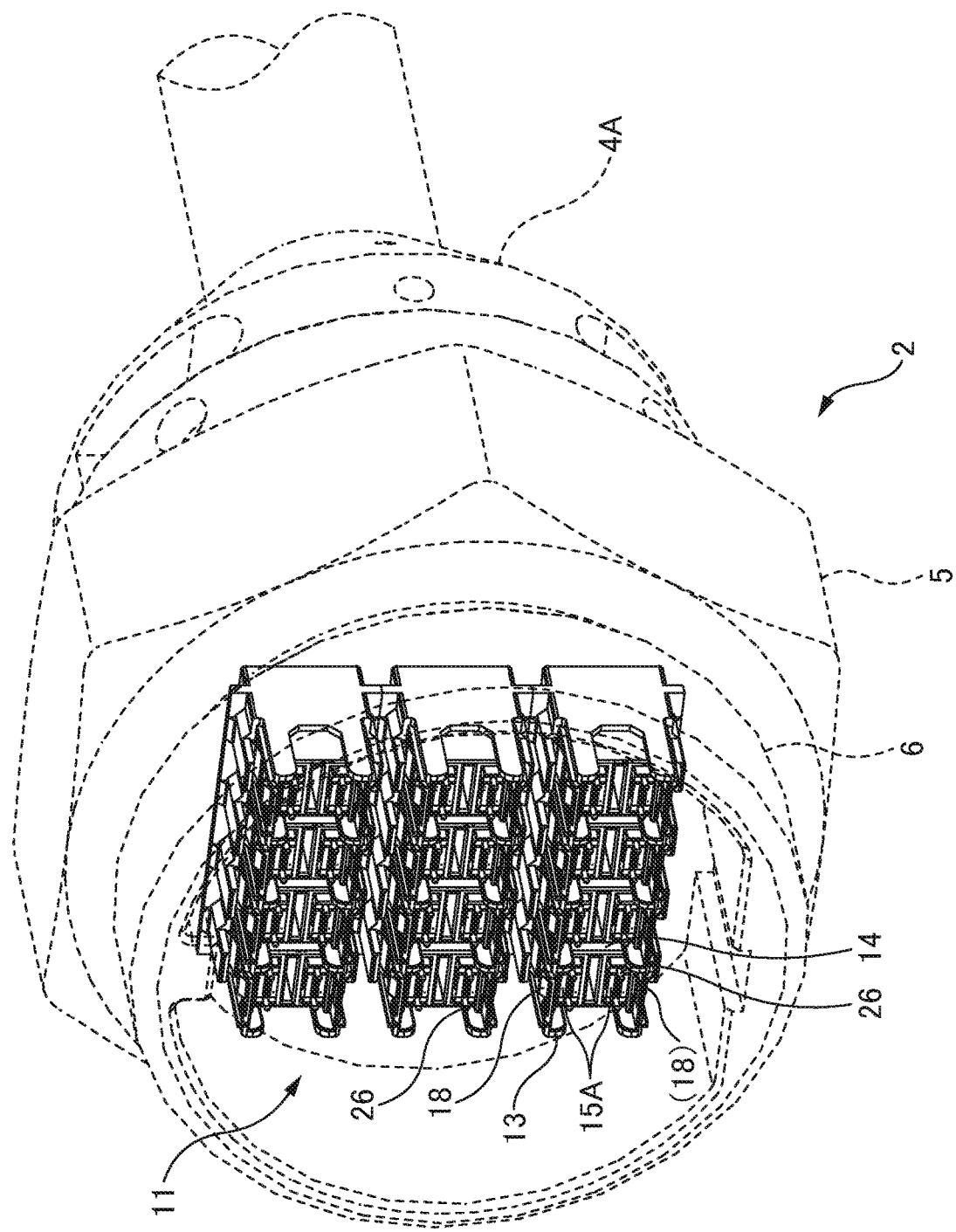
FIG. 2 is a perspective view of an enlarged part of a receptacle-side connector module 11 of the optical receptacle 2, in accordance with one or more embodiments.
Figure 3:
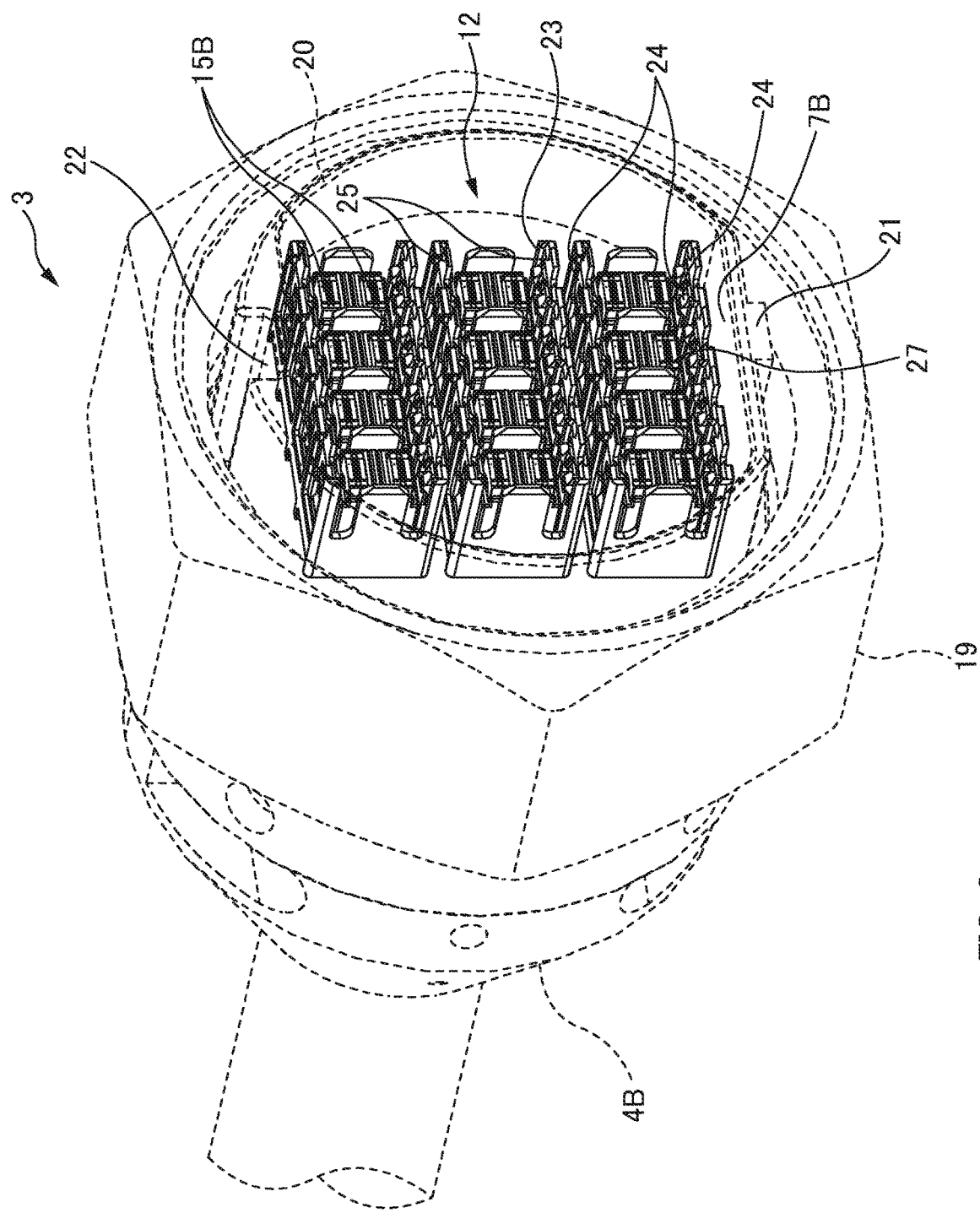
FIG. 3 is a perspective view of an enlarged part of a plug-side connector module 12 of the optical plug 3, in accordance with one or more embodiments.
Figure 11:
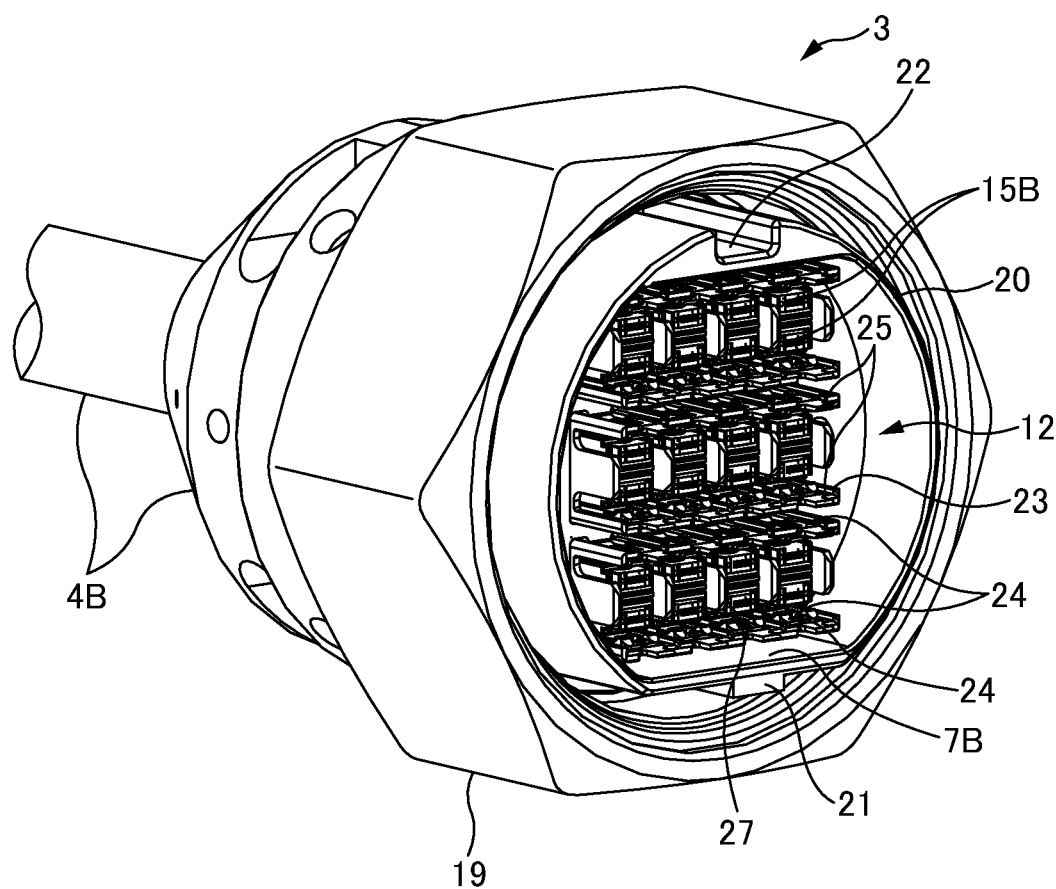
FIG. 11 is a perspective view of the optical plug 3, in accordance with one or more embodiments.

FIG. 1 is a perspective view of an optical connector 1 before an optical receptacle 2 and an optical plug 3 are coupled to each other. FIG. 2 is a perspective view of an enlarged part of a receptacle-side connector module 11 of the optical receptacle 2. FIG. 11 is a perspective view of the optical plug 3. FIG. 3 is a perspective view of an enlarged part of a plug-side connector module 12 of the optical plug 3. In one or more embodiments, a basic configuration of the optical connector 1 illustrated in FIGS. 1 to 3 will be described.

In the following description, each direction will be defined as illustrated in FIG. 1. In other words, a direction of attaching and detaching of the optical connector 1 is a "front-rear direction", an optical receptacle 2 side is the "front", and an opposite side (optical plug 3 side) is the "rear". The front-rear direction may also be referred to as a "Z direction" or a "direction of attaching and detaching". In a plane including a flat part 7A of an inner surface of a receptacle-side cylindrical part 6, a direction perpendicular to the front-rear direction is a "left-right direction", a right side toward a connecting endface of the receptacle-side connector module 11 is the "right", and a left side is the "left". The left-right direction may also be referred to as an "X direction". A direction perpendicular to the front-rear direction and the left-right direction is an "up-down direction", a receptacle-side recess 8 side of the receptacle-side cylindrical part 6 is "down", and an opposite side (receptacle-side projection 9 side) is "up". The up-down direction may also be referred to as a "Y direction".

Basic Configuration of Optical Connector 1:

The optical connector 1 is a connector for connecting high-density multicore optical fibers. The "high-density multicore optical fiber" refers to an optical fiber bundle having a large number of optical fibers such as 1000 and 2000 optical fibers, for example. An optical connector that connects the high-density multicore optical fibers to each other by using a plurality of connector modules is referred to as a "high-density multicore optical connector". The optical connector 1 in FIG. 1 represents a high-density multicore optical connector when 2000 optical fibers are connected as an example. Note that "high-density multicore" in one or more embodiments is not limited to a specific number of optical fibers such as 1000 and 2000 optical fibers, and may refer to a considerably great number of optical fibers.

The optical connector 1 includes the optical receptacle 2 and the optical plug 3.

The optical receptacle 2 includes the receptacle-side connector module 11 on a reception side when connector modules 10 are connected to each other. The optical receptacle 2 can connect the connector modules 10 to each other by fitting into the optical plug 3. Note that, in an actual connection operation, an operator holds the optical receptacle 2 in a right hand and the optical plug 3 in a left hand, for example, and fits the optical receptacle 2 and the optical plug 3 together by bringing them close to each other. Therefore, the "receptacle side" or the "reception side" indicates a meaning for convenience, and is not necessarily limited to an immovable side (received side) with respect to a "plug side" or a "movable side".

The optical receptacle 2 includes a grip 5, the receptacle-side cylindrical part 6, an optical fiber holding part 4A, and the receptacle-side connector module 11.

The grip 5 is a section capable of gripping the optical receptacle 2 when the optical plug 3 is attached and detached. The grip 5 has a hexagonal prism shape similarly to a nut part 19 of the optical plug 3, which will be described later. Therefore, when the optical receptacle 2 and the optical plug 3 are attached and detached, the operator can perform a clamping operation by turning a wrench on both the optical plug 3 side (the nut part 19 described later) and the optical receptacle 2 side (the grip 5). In this way, clamping torque of the optical receptacle 2 and the optical plug 3 increases, and an operation efficiency of the connection operation improves.

The receptacle-side cylindrical part 6 is a section capable of performing rough positioning before a plug-side cylindrical part 20 of the optical plug 3, which will be described later, fits into the receptacle-side cylindrical part 6 and the connector modules 10 are connected to each other. An inner diameter of the receptacle-side cylindrical part 6 is slightly greater than an outer diameter of the plug-side cylindrical part 20 such that the plug-side cylindrical part 20 accurately fits without tottering.

The receptacle-side cylindrical part 6 is screwed into the nut part 19 of the optical plug 3 and is fastened. Thus, a male screw is formed on an outer surface of the receptacle-side cylindrical part 6. The male screw of the receptacle-side cylindrical part 6 is screwed into a female screw formed on an inner surface of the nut part 19 and is fastened.

A part on a lower side of the inner surface of the receptacle-side cylindrical part 6 is the flat part 7A. The receptacle-side recess 8 extending in the front-rear direction is provided at the center of the flat part 7A. Furthermore, the receptacle-side projection 9 extending in the front-rear direction is provided at a place of the inner surface of the receptacle-side cylindrical part 6 that faces the receptacle-side recess 8. In this way, the up-down direction in an opening of the receptacle-side cylindrical part 6 can be easily determined, thereby facilitating fitting with the plug-side cylindrical part 20 in which a flat part (flat part 7B), a projection (plug-side projection 21), and a recess (plug-side recess 22) are similarly formed. The optical plug 3 can be prevented from fitting to the optical receptacle 2 upside down, and thus the operation efficiency of the connection operation improves.

The optical fiber holding part 4A is a member serving as a cover that holds the high-density multicore optical fiber to the receptacle-side connector module 11. The grip 5, the receptacle-side cylindrical part 6, and the optical fiber holding part 4A together may be referred to as a casing on the receptacle side.

In one or more embodiments, a receptacle-side housing (an outer housing 13 and an inner housing 14 described later) is provided to be movable to a certain extent in an XY plane with respect to the casing on the receptacle side. In other words, "play" is provided between the receptacle-side housing and the casing on the receptacle side (see FIG. 6 being a cross-sectional view taken along an A-A line in FIG.

4, which will be described later). Movement of the receptacle-side housing in the XY plane with respect to the casing on the receptacle side may be referred to as "XY floating". A mechanism for enabling the XY floating may be referred to as an "XY floating mechanism".

Next, a basic configuration of the receptacle-side connector module 11 of the optical receptacle 2 will be described with reference to FIG. 2. In the following description, a receptacle side of the connector module 10 is referred to as the receptacle-side connector module 11, and a plug side of the connector module 10 is referred to as the plug-side connector module 12. Note that, in FIG. 2, the grip 5, the receptacle-side cylindrical part 6, and the optical fiber holding part 4A are omitted from illustration and indicated by visible outlines by a dotted line for explaining the basic configuration of the receptacle-side connector module 11.

In the optical receptacle 2 in one or more embodiments, four in the left-right direction and three in the up-down direction and a total of 12 receptacle-side connector modules 11 are arranged. The left-right arrangement direction of the receptacle-side connector module 11 is parallel to the X direction (left-right direction), and the up-down arrangement direction thereof is parallel to the Y direction (up-down direction).

The receptacle-side connector module 11 includes the outer housing 13, the inner housing 14, and receptacle-side ferrules 15A.

The outer housing 13 and the inner housing 14 serve as the housing on the receptacle side, and hold the receptacle-side ferrule 15A. The outer housing 13 and the inner housing 14 may be collectively referred to as a receptacle-side housing. The outer housing 13 is a cylindrical member extending in the front-rear direction, and houses the inner housing 14 therein. The inner housing 14 is a cylindrical member extending in the front-rear direction, and houses the receptacle-side ferrule 15A therein. Note that the inner housing 14 in one or more embodiments houses two receptacle-side ferrules 15A in the up-down direction.

In a state where the optical receptacle 2 and the optical plug 3 are not connected to each other, when a pair of catch pawl parts 16 (not illustrated in FIG. 2, see FIG. 9A) provided on upper and lower surfaces of the inner housing 14 are locked by a movement regulation part 17 (not illustrated in FIG. 2, see FIG. 9A) provided on a surface of the outer housing 13 facing the catch pawl parts 16, the outer housing 13 and the inner housing 14 enter a locked state, and further movement of the inner housing 14 to the front side (opposite side to the plug side) with respect to the outer housing 13 is regulated. The inner housing 14 includes a regulation protrusion 33 (see FIG. 9A). The regulation protrusion 33 is a section that protrudes in a direction orthogonal to the front-rear direction in an end part of the inner housing 13, and is a section that abuts the outer housing. The regulation protrusion 33 of the inner housing 14 abuts the outer housing 13, and thus further movement of the inner housing 14 to the rear side (plug side) with respect to the outer housing 13 is regulated. In other words, the regulation protrusion 33 of the inner housing 14 abuts the outer housing 13, and thus the inner housing 14 is prevented from exiting to the rear side (plug side) with respect to the outer housing 13. In this way, in the state where the optical receptacle 2 and the optical plug 3 are not connected to each other, the movement of the inner housing 14 in the front-rear direction with respect to the outer housing 13 is regulated within a range between the locked state where the catch pawl parts 16 are locked by the movement regulation part 17 and a state where the regulation protrusion 33 abuts the outer housing. However, when the state where the catch pawl parts 16 are locked by the movement regulation part 17 is released, the inner housing 14 enters a state of being movable to the front side (opposite side to the plug side) with respect to the outer housing 13 further than in the locked state (described later).

The inner housing 14 includes a pair of engagement sections 18 on the upper and lower surfaces. When the optical receptacle 2 and the optical plug 3 are connected to each other, the engagement section 18 engages with an engaged section 24 (not illustrated in FIG. 2, see FIG. 3 or FIG. 9A) of a plug-side housing 23, which will be described later, and thus the inner housing 14 and the plug-side housing 23 are connected to each other.

An endface of each receptacle-side ferrule 15A physically butt couples to an endface of a plug-side ferrule 15B, and thus optical fibers on the plug side and the receptacle side are optically connected to each other. The receptacle-side ferrule 15A is biased by pressure of a spring 28A (not illustrated in FIG. 2, see FIG. 5) disposed on the front of the receptacle-side ferrule 15A in order to physically abut the ferrule endfaces to each other. The receptacle-side ferrule 15A is held by the inner housing 14 to be retractable while being biased by the pressure of the spring 28A.

The receptacle-side ferrule 15A may be a lens coupling-type ferrule. The lens coupling-type ferrule is a ferrule capable of optically connecting endfaces of optical fibers to each other without bringing them into physical contact. In the lens coupling-type ferrule, a lens is disposed at a ferrule end part, light emitted from an optical fiber tip is collimated, and the light is transmitted to a ferrule at a connection destination. A lens for causing the collimated light to be incident on an optical fiber tip is disposed at an end part of the ferrule at the connection destination. The lens coupling-type ferrule performs optical connection in such a manner. In this way, pressure of a spring for biasing a ferrule to a connecting endface side can be reduced in the lens coupling-type ferrule as compared to a ferrule in which ferrule endfaces with an exposed optical fiber endface butt against each other.

Next, a configuration of the optical plug 3 will be described with reference to FIGS. 1, 11, and 3. The optical plug 3 includes the plug-side connector module 12 on the movable side when the connector modules 10 are connected to each other. The optical plug 3 can connect the connector modules 10 to each other by fitting to the optical receptacle 2. Note that, similarly to the optical receptacle 2 described above, the "plug side" or the "movable side" indicates a meaning for convenience, and is not necessarily limited to a movable side with respect to the "receptacle side" or the "reception side".

The optical plug 3 includes the nut part 19, the plug-side cylindrical part 20, an optical fiber holding part 4B, and the plug-side connector module 12.

The nut part 19 is a section capable of allowing the male screw formed on the outer surface of the receptacle-side cylindrical part 6 of the optical receptacle 2 to be screwed thereinto and fastening the male screw. Thus, the female screw is formed on the inner surface of the nut part 19. The nut part 19 is provided to be rotatable with respect to the plug-side cylindrical part 20 and the optical fiber holding part 4B.

The nut part 19 is a section capable of allowing the male screw formed on the outer surface of the receptacle-side cylindrical part 6 of the optical receptacle 2 to be screwed thereinto and fastening the male screw. Thus, the female screw is formed on the inner surface of the nut part 19 (not illustrated). The nut part 19 is provided to be rotatable with respect to the plug-side cylindrical part 20 and the optical fiber holding part 4B.

The plug-side cylindrical part 20 is a section capable of performing rough positioning before the plug-side cylindrical part 20 fits into the receptacle-side cylindrical part 6 of the optical receptacle 2 described above and the connector modules 10 are connected to each other. In other words, rough positioning before the engagement between the inner housing 14 and the plug-side housing 23 can be performed. The outer diameter of the plug-side cylindrical part 20 is slightly smaller than the inner diameter of the receptacle-side cylindrical part 6 such that the receptacle-side cylindrical part 6 accurately fits without tottering.

A part on a lower side of the plug-side cylindrical part 20 is the flat part 7B. The plug-side projection 21 extending in the front-rear direction is provided to the lower center of the flat part 7B. Furthermore, the plug-side recess 22 extending in the front-rear direction is provided at a place of the plug-side cylindrical part 20 that faces the plug-side projection 21. In this way, the up-down direction in an opening of the plug-side cylindrical part 20 can be easily determined, thereby facilitating fitting with the receptacle-side cylindrical part 6 in which the flat part (flat part 7A), the recess (receptacle-side recess 8), and the projection (receptacle-side projection 9) are similarly formed. The optical receptacle 2 can be prevented from fitting to the optical plug 3 upside down, and thus the operation efficiency of the connection operation improves.

The optical fiber holding part 4B is a member serving as a cover that holds the high-density multicore optical fiber to the plug-side connector module 12. The nut part 19, the plug-side cylindrical part 20, and the optical fiber holding part 4B together may be referred to as a casing on the plug side.

Next, a basic configuration of the plug-side connector module 12 of the optical plug 3 will be described with reference to FIG. 3. Note that, in FIG. 3, the nut part 19, the plug-side cylindrical part 20, and the optical fiber holding part 4B of the optical plug 3 are omitted from illustration and indicated by visible outlines by a dotted line for explaining the basic configuration of the plug-side connector module 12.

In the optical plug 3 in one or more embodiments, four in the left-right direction and three in the up-down direction and a total of 12 plug-side connector modules 12 are arranged similarly to the receptacle-side connector modules 11. The left-right arrangement direction of the plug-side connector module 12 is parallel to the X direction (left-right direction), and the up-down arrangement direction thereof is parallel to the Y direction (up-down direction). The plug-side connector modules are disposed to be connected to the respective corresponding receptacle-side connector modules 11.

The plug-side connector module 12 includes the plug-side housing 23 and plug-side ferrules 15B.

The plug-side housing 23 is a member that serves as the housing on the plug side, and holds the plug-side ferrules 15B. The plug-side housing 23 is a cylindrical member extending in the front-rear direction, and houses the plug-side ferrule 15B therein. Note that the plug-side housing 23 in one or more embodiments houses two plug-side ferrules 15B in the up-down direction.

The plug-side housing 23 includes the pair of engaged sections 24 on upper and lower surfaces. When the optical receptacle 2 and the optical plug 3 are connected to each other, the engaged section 24 engages with the engagement section 18 of the inner housing 14 described above, and thus the plug-side housing 23 and the inner housing 14 are connected to each other.

The plug-side housing 23 includes a pair of unlocking sections 25 on the upper and lower surfaces. When the optical receptacle 2 and the optical plug 3 are connected to each other, the unlocking section 25 releases a locked state between the outer housing 13 and the inner housing 14 (a state where they cannot move with respect to each other) by freeing the movement regulation part 17 from the pair of catch pawl parts 16 of the inner housing 14. Note that a state where the locked state is released may be referred to as an "unlocked state". When entering the unlocked state, the inner housing 14 enters a state of being movable to the front side (opposite side to the plug side) with respect to the outer housing 13 further than in the locked state (described later).

The endface of each plug-side ferrule 15B physically butt couples to the endface of the receptacle-side ferrule 15A, and thus the optical fibers on the plug side and the receptacle side are optically connected to each other. The plug-side ferrule 15B is biased by pressure of a spring 28B (not illustrated in FIG. 3, see FIG. 5) disposed on the rear of the plug-side ferrule 15B in order to physically butt the ferrule endfaces against each other. The plug-side ferrule 15B is held with the plug-side housing 23 to be retractable while being biased by the pressure of the spring 28B. The plug-side ferrule 15B may be a lens coupling-type ferrule, similarly to the receptacle-side ferrule 15A.

Situation During Connection Between Optical Receptacle 2 and Optical Plug 3:

Next, the XY floating mechanism and a Z floating mechanism of the connector module 10 will be described along a connection sequence of the optical receptacle 2 and the optical plug 3.

The connection sequence of the optical receptacle 2 and the optical plug 3 is divided into five stages as indicated by following Table 1 and is performed. Table 1 describes a number of a corresponding drawing at each of the stages. Furthermore, Table 1 describes a contact or connection place on the optical receptacle 2 side and the optical plug 3 side, which is a factor of each of the stages.

TABLE 1

Figure 4:
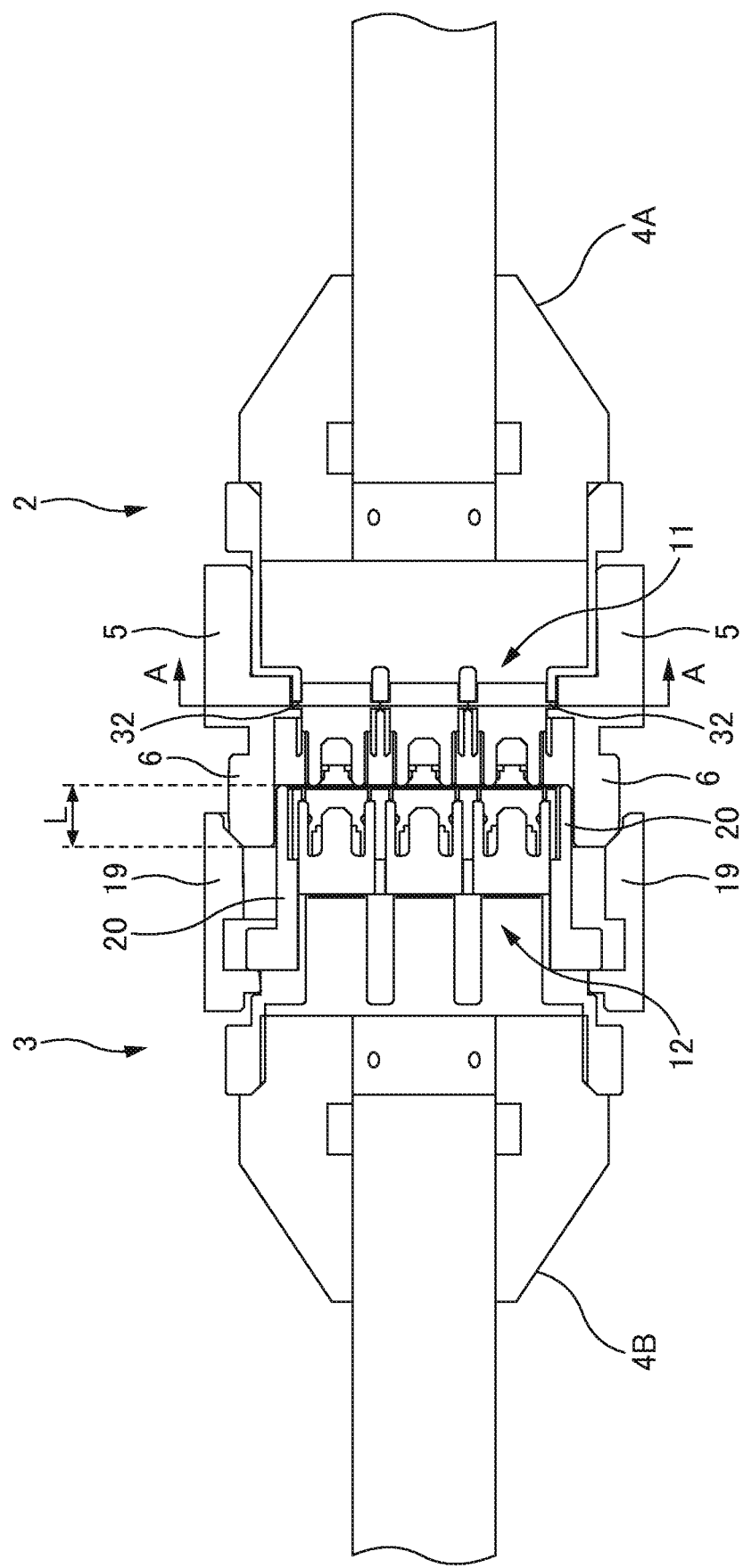
FIG. 4 is a cross-sectional view in a YZ plane of the optical connector 1 at timing at which a receptacle-side cylindrical part 6 starts to be screwed into a nut part 19, in accordance with one or more embodiments.
Figure 5:
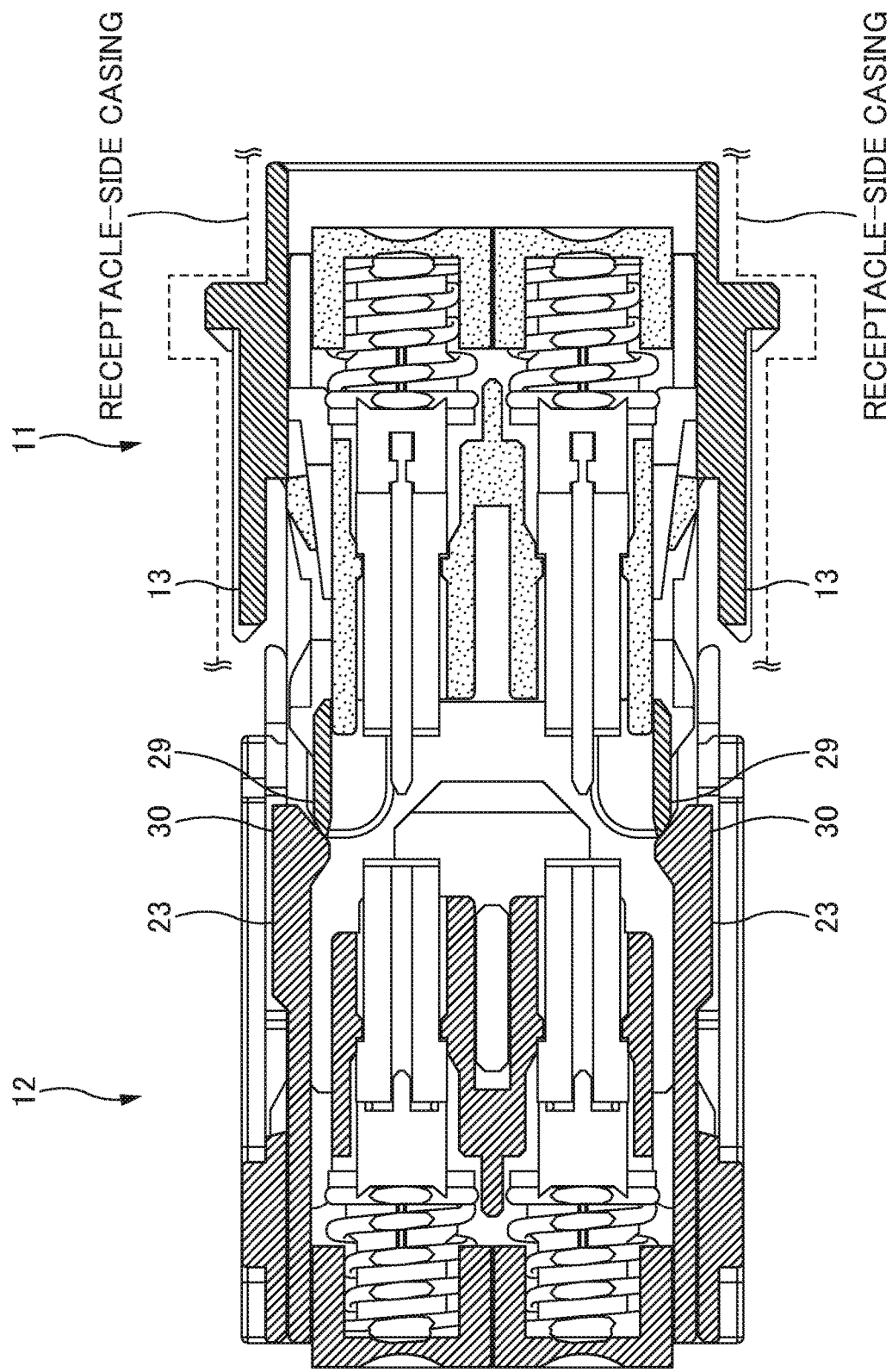
FIG. 5 is a cross-sectional view in the YZ plane of a connector module 10 at timing at which a plug-side housing 23 abuts an outer housing 13 for the first time, in accordance with one or more embodiments.
Figure 7:
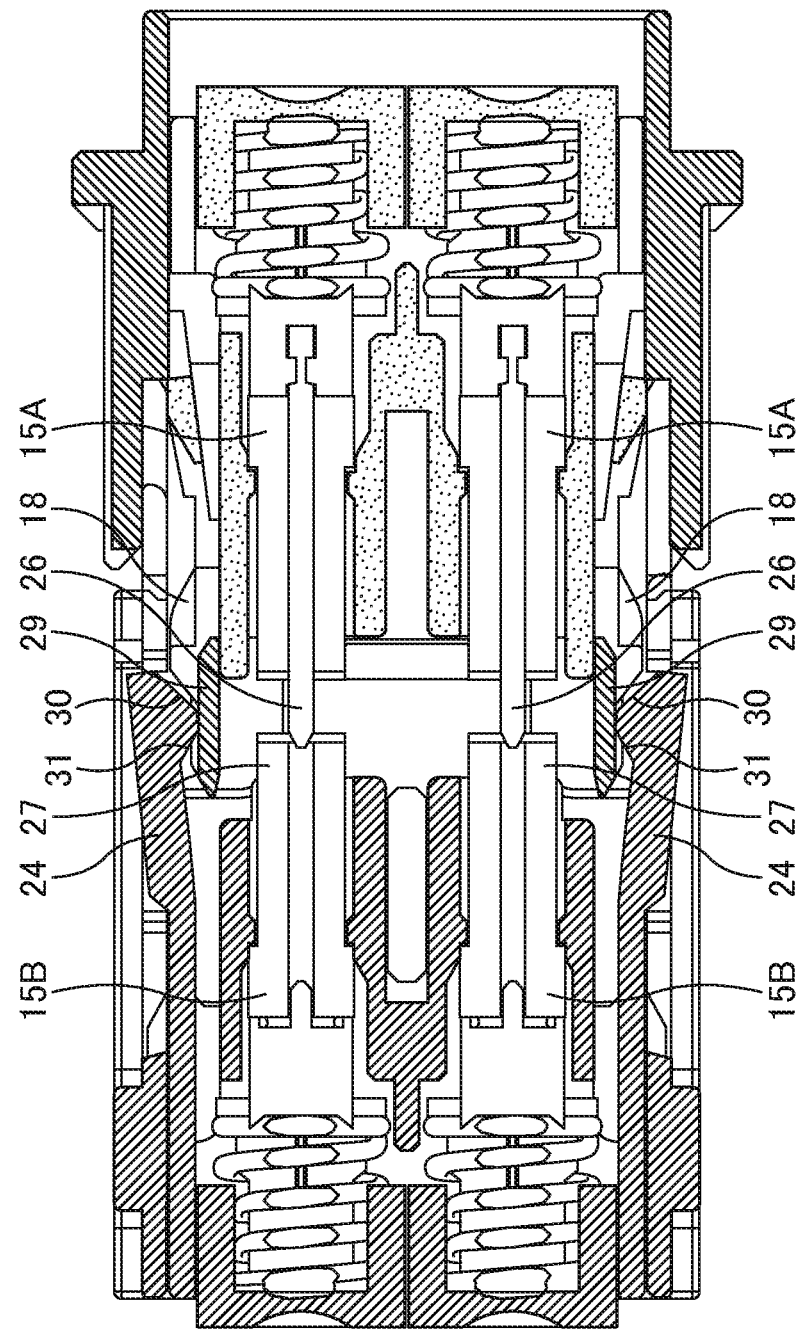
FIG. 7 is a cross-sectional view of the connector module 10 in the YZ plane at timing at which a ferrule pin 26 starts to fit into a ferrule hole 27, in accordance with one or more embodiments.
Figure 8:
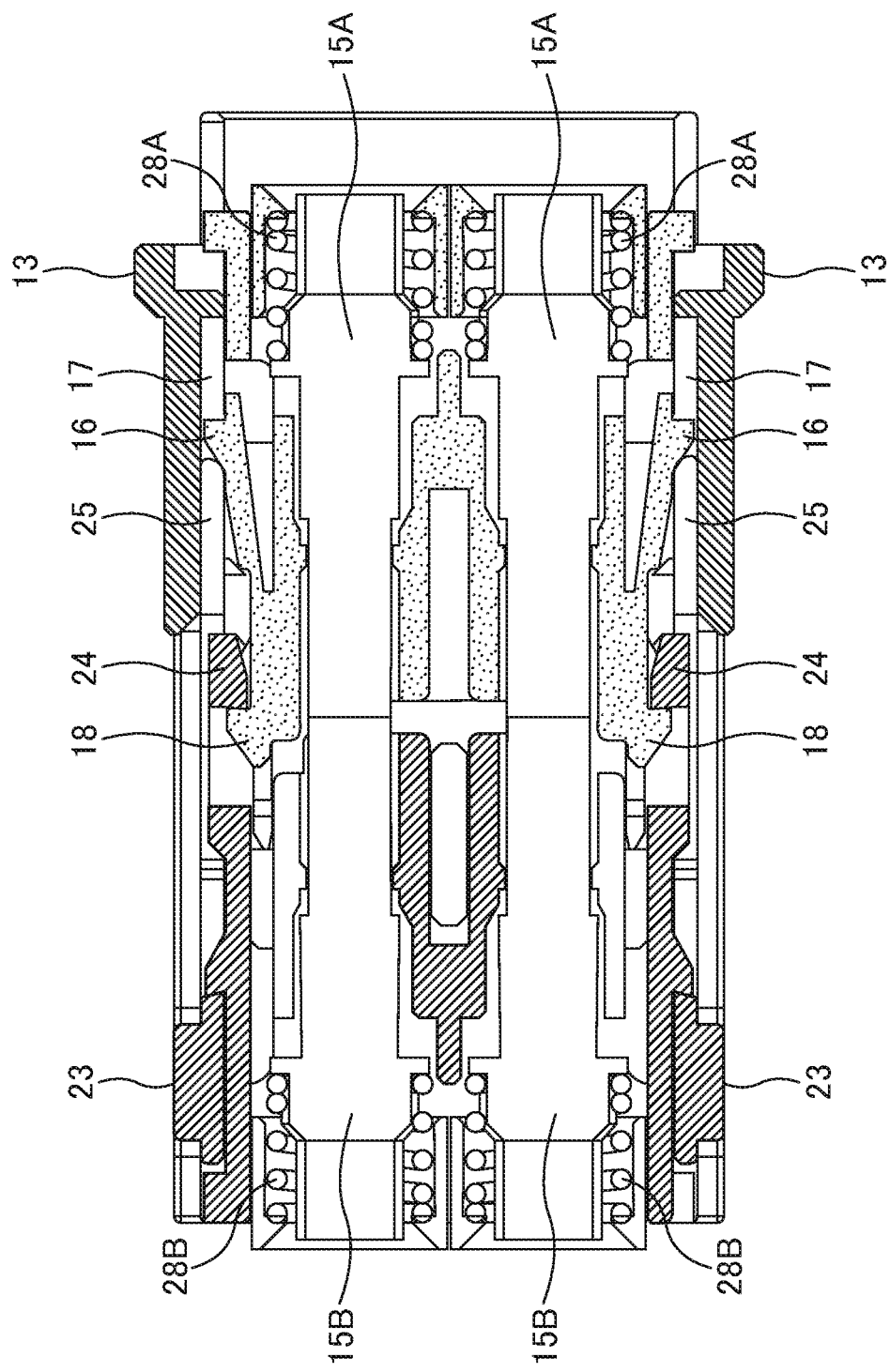
FIG. 8 is a cross-sectional view of the connector module 10 in the YZ plane at timing at which an inner housing 14 and the plug-side housing 23 engage with each other, in accordance with one or more embodiments.

| | | Contact or Connection Place | |
|---|---|---|---|
| Stage | Drawing | Optical Receptacle 2 Side | Optical Plug 3 Side |
| 1 | FIG. 4 | Receptacle-side Cylindrical Part 6 | Nut Part 19 |
| 2 | FIG. 5 | Engagement Guide Part 29 | Front Abutment Surface 30 of Engaged Section 24 |
| 3 | FIG. 7 | Ferrule Pin 26 | Ferrule Hole 27 |
| 4 | FIG. 8 | Engagement Section 18 | Engaged Section 24 |
| 5 | FIG. 9 | Catch Pawl Part 16 Movement Regulation Part 17 | Unlocking section 25 |

The connection sequence (connection stage 1 to connection stage 5) of the optical receptacle 2 and the optical plug 3 can be performed by only one operation of screwing the receptacle-side cylindrical part 6 into the nut part 19. Hereinafter, the operation of screwing the receptacle-side cylindrical part 6 into the nut part 19 may be referred to as a "screwing operation". By this screwing operation, the receptacle-side connector module 11 and the plug-side connector module 12 move close to each other and are connected to each other. In this way, the operator who connects the optical receptacle 2 and the optical plug 3 can easily collectively connect the plurality of ferrules that connect the high-density multicore optical fibers to each other only by performing a simple operation that is the screwing operation.

Before Connection Stage 1 (Before Start of Screwing Operation)

Before the connection stage 1, that is, before the receptacle-side cylindrical part 6 starts to be screwed into the nut part 19, the movement of the inner housing 14 in the front-rear direction with respect to the outer housing 13 is regulated within the range between the locked state where the catch pawl parts 16 are locked with the movement regulation part 17 and the state where the regulation protrusion 33 abuts the outer housing. In other words, the movement of the inner housing 14 to the front side (opposite side to the plug side) with respect to the outer housing 13 further than that in the locked state is regulated. The regulation protrusion 33 of the inner housing 14 abuts the outer housing 13, and thus the inner housing 14 is prevented from exiting to the rear side (plug side) with respect to the outer housing 13.

Connection Stage 1 (Rough Positioning)

FIG. 4 is a cross-sectional view of the optical connector 1 in a YZ plane at timing at which the receptacle-side cylindrical part 6 starts to be screwed into the nut part 19. At this stage, none of parts of the receptacle-side connector module 11 and the plug-side connector module 12 are in contact yet. However, as illustrated in FIG. 4, the plug-side cylindrical part 20 fits into the receptacle-side cylindrical part 6 only by a certain length L. In this way, relatively rough positioning of the receptacle-side connector module 11 and the plug-side connector module 12 can be previously performed such that fitting of a ferrule pin 26 and a ferrule hole 27 can be accurately performed at the subsequent connection stage 3. Note that the length L is a sufficient length to the extent that the plug-side cylindrical part 20 does not totter with respect to the receptacle-side cylindrical part.

In one or more embodiments, in the connection between the optical receptacle 2 and the optical plug 3, the receptacle-side connector module 11 and the plug-side connector module 12 cannot be brought close to each other from the state illustrated in FIG. 4 unless the nut part 19 is rotated. Thus, breakage of the connector module 10 due to a collision between the receptacle-side connector module 11 and the plug-side connector module 12 during the connection between the optical receptacle 2 and the optical plug 3 can be prevented.

Connection Stage 2 (Misalignment Absorption by XY Floating)

FIG. 5 is a cross-sectional view of the connector module 10 in the YZ plane at timing at which the plug-side housing 23 abuts the outer housing 13 for the first time. At this stage, a front abutment surface 30 formed on the engaged section 24 of the plug-side housing 23 abuts an engagement guide part 29 of the outer housing 13. In one or more embodiments, since the receptacle-side housing is provided to be movable in the XY plane with respect to the casing on the receptacle side, the receptacle-side housing moves in the XY plane with respect to the casing on the receptacle side to match a position (position in the XY plane) of the plug-side housing 23 by the plug-side housing 23 (specifically, the front abutment surface 30) butting against the outer housing 13 (specifically, the engagement guide part 29). In this way, relative misalignment between the receptacle-side housing and the plug-side housing 23 can be absorbed. In other words, in one or more embodiments, the relative misalignment between the receptacle-side housing and the plug-side housing 23 can be absorbed by providing the XY floating mechanism (mechanism for allowing the receptacle-side housing to move in the XY plane with respect to the casing on the receptacle side).

With reference to FIG. 4, a pair of projecting parts provided in the up-down direction of the outer housing 13 are sandwiched between two members of the grip 5 and the optical fiber holding part 4A from the front-rear direction. In this way, a "play" part in the XY direction can be provided while preventing the outer housing 13 from being detached from the casing on the receptacle side.

Figure 6:
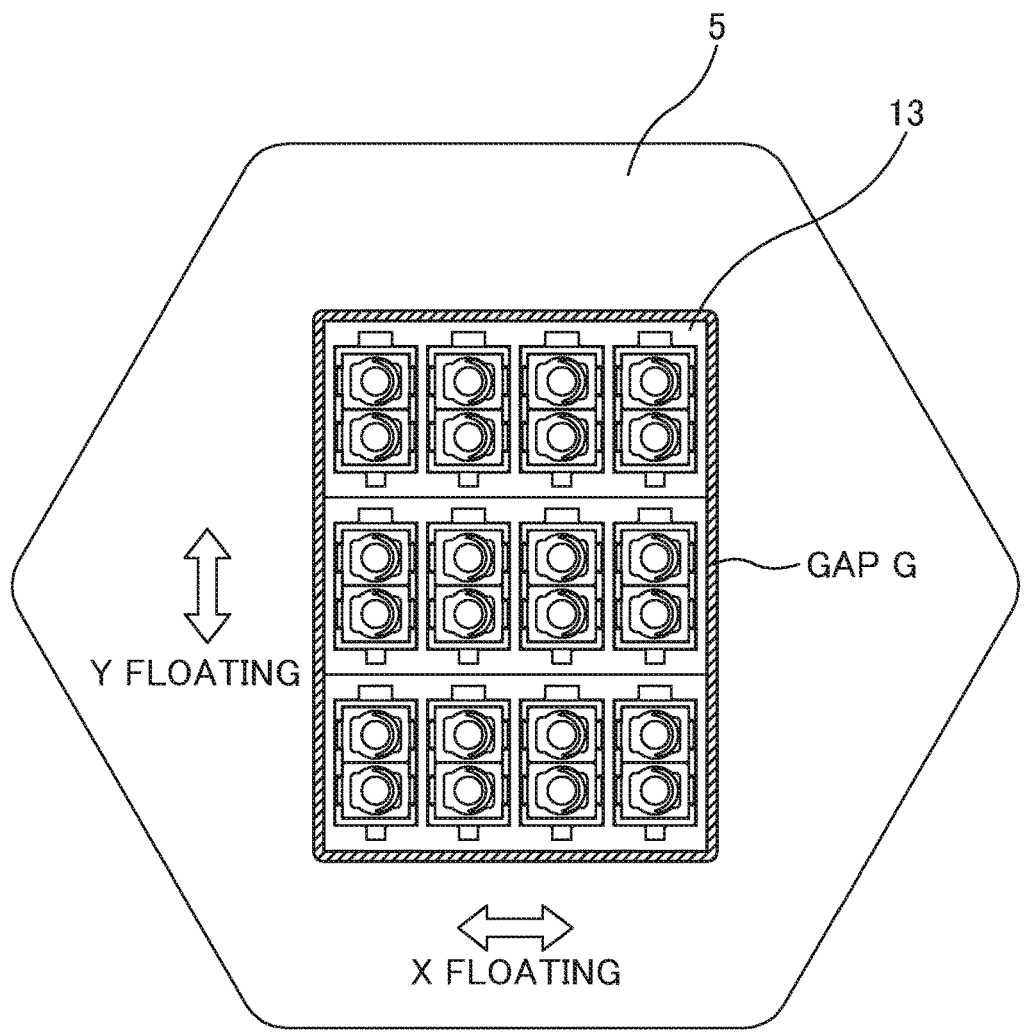
FIG. 6 is a cross-sectional view taken along an A-A line in FIG. 4.

FIG. 6 is a cross-sectional view taken along an A-A line in FIG. 4. As illustrated in FIG. 6, a certain gap G is present at a boundary between the outer housing 13 and the grip 5. Thus, the outer housing 13 can move in the X direction and the Y direction by this gap. In other words, the XY floating is possible. The mechanism capable of moving in the X direction or the Y direction in this way is referred to as the XY floating mechanism.

Connection Stage 3 (Alignment Between Ferrule Endfaces)

FIG. 7 is a cross-sectional view in the YZ plane of the connector module 10 at timing at which the ferrule pin 26 starts to fit into the ferrule hole 27. Since the alignment in the XY plane between the receptacle-side housing and the plug-side housing 23 is already performed at the connection stage 2 described above, the ferrule pin 26 of the receptacle-side ferrule 15A can be inserted into the ferrule hole 27 of the plug-side ferrule 15B. As a result, the endfaces of the receptacle-side ferrule 15A and the plug-side ferrule 15B can accurately abut each other.

At this time, a projection formed by the front abutment surface 30 and a rear abutment surface 31 that are located on the engaged section 24 of the plug-side housing 23 is elastically displaced to an opposite side to the plug-side ferrule 15B by the engagement section 18 of the outer housing 13. In this way, the engagement section 18 of the inner housing 14 is guided to easily engage with the engaged section 24 of the plug-side housing 23 at the connection stage 4.

Note that, when the ferrule endfaces contact each other, the receptacle-side ferrule 15A receives force on the front side (opposite side to the plug side). This causes the locked state where the catch pawl part 16 of the inner housing 14 on the receptacle side is locked with the movement regulation part 17 of the outer housing 13. At this stage, the movement of the inner housing 14 to the front side (opposite side to the plug side) with respect to the outer housing 13 further than that in the locked state is regulated.

Connection Stage 4 (Fixing of Mechanical Reference Planes Between Ferrule Endfaces)

FIG. 8 is a cross-sectional view of the connector module 10 in the YZ plane at timing at which the inner housing 14 and the plug-side housing 23 engage with each other. The engagement section 18 of the inner housing 14 is engaged by engaging with the engaged section 24 of the plug-side housing 23. By this engagement, abutment surfaces (mechanical reference planes) between the endfaces of the receptacle-side ferrule 15A and the plug-side ferrule 15B are fixed. In the state where the engagement section 18 engages with the engaged section 24, the inner housing 14 and the plug-side housing 23 have a predetermined positional relationship while the endfaces of the receptacle-side ferrule 15A and the plug-side ferrule 15B butt against each other, and the spring 28A and the spring 28B are deformed by a predetermined amount. Thus, in the state where the engagement section 18 engages with the engaged section 24, the receptacle-side ferrule 15A and the plug-side ferrule 15B are butting against each other with predetermined pressure by the spring 28A and the spring 28B.

At this stage, the pair of catch pawl parts 16 provided on the upper and lower surfaces of the inner housing 14 are locked by the movement regulation part 17 provided on the surfaces of the outer housing 13 facing the catch pawl parts 16, and the outer housing 13 and the inner housing 14 are in the locked state (the state where they cannot move with respect to each other). Note that, at this stage, the unlocking section 25 of the plug-side housing 23 (optical plug 3 side) contacts the catch pawl parts 16 of the inner housing 14 (optical receptacle 2 side), but the unlocking section 25 does not elastically deform the catch pawl parts 16 toward the receptacle-side ferrule 15A side, which is not in the unlocked state. Thus, at this stage, the positional relationship between the outer housing 13 and the inner housing 14 remains fixed.

Connection Stage 5 (Release from Locked State and Dimensional Tolerance Absorption by Z Floating)

FIGS. 9A to 9D are explanatory diagrams for a situation where a state changes from a locked state to an unlocked state.

Figure 9A:
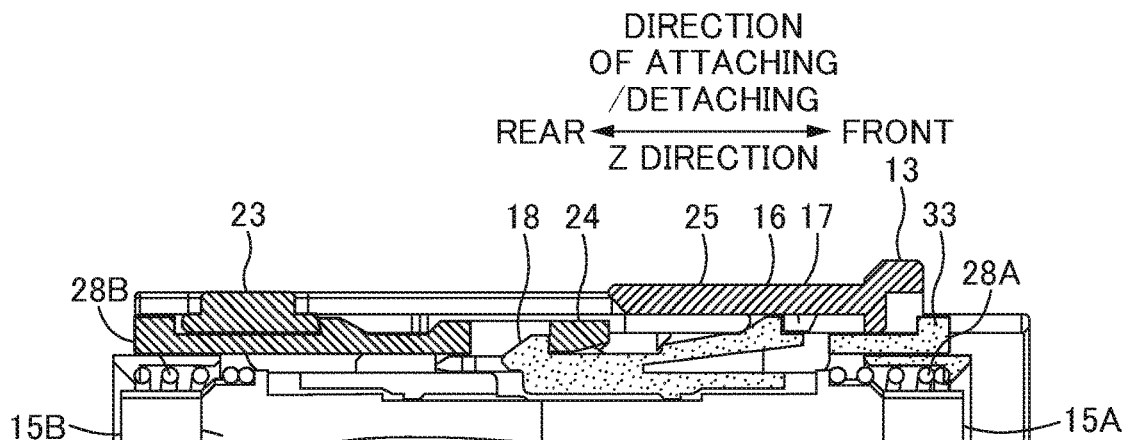
FIGS. 9A to 9D are explanatory diagrams for a situation where a state changes from a locked state to an unlocked state, in accordance with one or more embodiments.

FIG. 9A illustrates the state illustrated in FIG. 8 (the state where the engagement section 18 engages with the engaged section 24). As already described above, in the state illustrated in FIG. 9A, the catch pawl part 16 of the inner housing 14 is locked by the movement regulation part 17 of the outer housing 13, and the outer housing 13 and the inner housing 14 are in the locked state (the state where they cannot move with respect to each other).

Figure 9B:
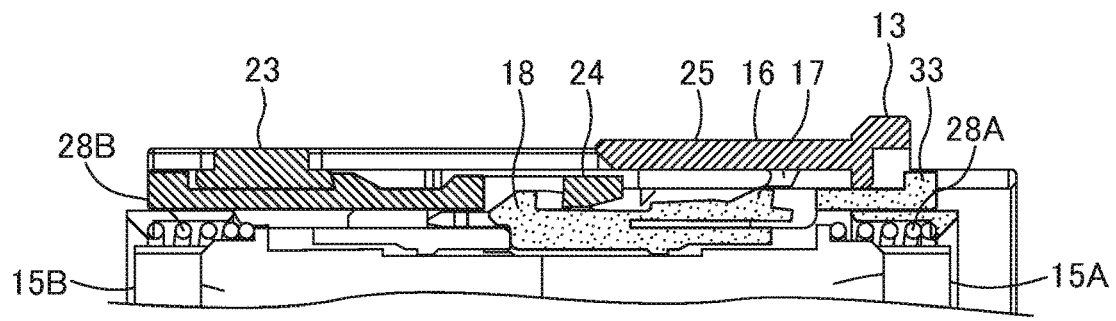

When the screwing operation continues further from the state (the state where the engagement section 18 engages with the engaged section 24) illustrated in FIG. 9A and the connector modules 10 are brought closer to each other, the unlocking section 25 of the plug-side housing 23 elastically deforms the catch pawl part 16 of the inner housing 14 toward the receptacle-side ferrule 15A side (lower side in FIG. 9A), as illustrated in FIG. 9B. In this way, locking of the catch pawl part 16 by the movement regulation part 17 of the outer housing 13 (optical receptacle 2 side) is released, thereby leading to the unlocked state. In this way, the locked state between the outer housing 13 and the inner housing 14 is released, and the inner housing 14 can move to the front side (opposite side to the plug side) with respect to the outer housing 13. Note that, in the state illustrated in FIG. 9B, the spring 28A and the spring 28B are compressed and deformed as compared to those in the state illustrated in FIG. 9A.

Figure 9C:
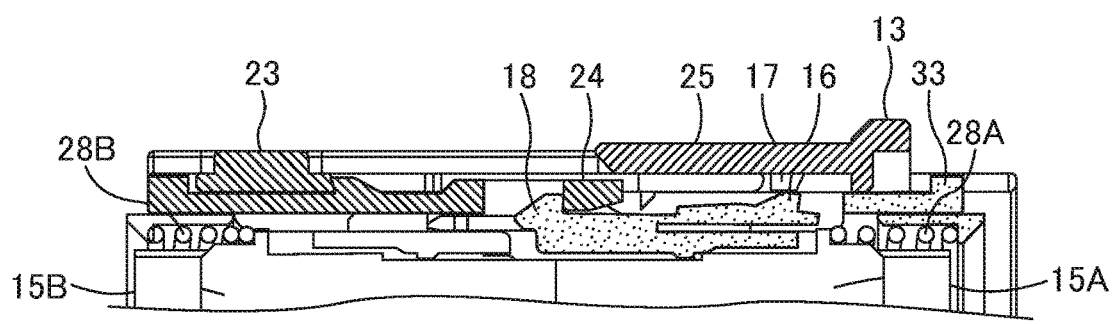

When entering the unlocked state as illustrated in FIG. 9B, the inner housing 14 can move to the front side (opposite side to the plug side) with respect to the outer housing 13. Thus, as illustrated in FIG. 9C, the inner housing 14 moves to the rear side (plug side) with respect to the outer housing 13 by force of the spring 28A and the spring 28B, thereby leading to the state where the engagement section 18 engages with the engaged section 24 again. As a result, the inner housing 14 and the plug-side housing 23 have the predetermined positional relationship, and the spring 28A and the spring 28B are in the stage of being deformed by the predetermined amount. Thus, the receptacle-side ferrule 15A and the plug-side ferrule 15B enter the state of butting against each other with the predetermined pressure by the spring 28A and the spring 28B.

The optical connector 1 according to one or more embodiments includes the plurality of connector modules 10, and misalignment in the Z direction of each of the connector modules 10 occurs due to an influence such as an attachment error of each of the connector modules 10. Since there is misalignment (dimensional tolerance) in the Z direction of the connector module 10 in such a manner, there is a possibility that, even when a certain connector module 10 shifts from the locked state (see FIG. 9A) to the unlocked state (see FIG. 9C), a different connector module 10 may not yet shift to the unlocked state. Thus, the screwing operation needs to continue further from the state illustrated in FIG. 9C, and the connector modules 10 need to be brought closer to each other such that all of the connector modules 10 shift to the unlocked state.

Figure 9D:
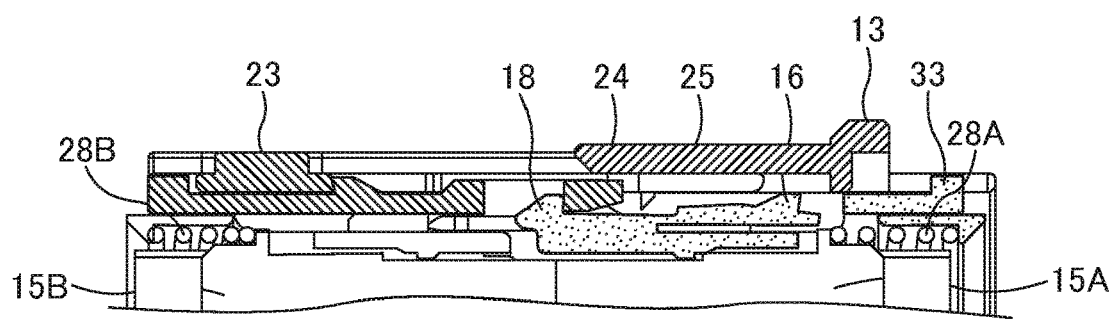

When the connector modules 10 are brought closer to each other further from those in the state illustrated in FIG. 9C, the state is already in the unlocked state. Thus, as illustrated in FIG. 9D, the inner housing 14 can move to the front side (opposite side to the plug side) with respect to the outer housing 13. At this time, since the engagement section 18 is in the state of engaging with the engaged section 24, the plug-side housing 23 engaging with the inner housing 14 also moves integrally with the inner housing 14 with respect to the outer housing 13. In this way, integral movement of the inner housing 14 and the plug-side housing 23 in the Z direction (herein, particularly the opposite side to the plug side) with respect to the outer housing 13 may be referred to as "Z floating". A mechanism for enabling the Z floating may be referred to as a "Z floating mechanism".

In one or more embodiments, after the unlocked state, the inner housing 14 and the plug-side housing 23 integrally move to the front side (opposite side to the plug side) with respect to the outer housing 13, and thus the state where the inner housing 14 and the plug-side housing 23 have the predetermined positional relationship is maintained. Thus, even after the inner housing 14 and the plug-side housing 23 integrally move in the Z direction with respect to the outer housing 13, the state where the spring 28A and the spring 28B are deformed by the predetermined amount is maintained. As a result, the state where the receptacle-side ferrule 15A and the plug-side ferrule 15B butt against each other with the predetermined pressure is also maintained.

In one or more embodiments, even when there is misalignment (dimensional tolerance) in the Z direction of the connector modules 10, the dimensional tolerance can be absorbed by performing the Z floating on each of the connector modules 10 by a movement amount in accordance with the dimensional tolerance. According to one or more embodiments, when the dimensional tolerance is absorbed, pressure biased to the receptacle-side ferrule 15A and the plug-side ferrule 15B does not vary for each of the connector modules 10, and the state where predetermined pressure is applied to the receptacle-side ferrule 15A and the plug-side ferrule 15B in any of the connector modules can be maintained.

The optical connector 1 according to one or more embodiments includes the plurality of connector modules 10. Thus, in order to achieve the predetermined positional relationship between the inner housing 14 and the plug-side housing 23 in all of the connector modules 10 (the state where the engagement section 18 engages with the engaged section 24), all the spring 28A and the spring 28B provided in each of the connector modules 10 need to be deformed by the predetermined amount. Since a great force is needed in order to deform all of the springs (the spring 28A and the spring 28B) of the plurality of connector modules 10 by the predetermined amount, it is difficult to directly press the springs with a hand of the operator and act such force on the springs.

The optical connector 1 according to one or more embodiments moves the receptacle-side connector module 11 and the plug-side connector module 12 close to each other by the screwing operation of the receptacle-side cylindrical part 6 and the nut part 19. The screwing torque generates a great axial force (force that brings the receptacle-side connector module 11 and the plug-side connector module 12 close to each other). Thus, the operator can generate force that deforms all of the springs (the spring 28A and the spring 28B) of the plurality of connector modules 10 by the predetermined amount only by performing the screwing operation.

Furthermore, in one or more embodiments, even when there is misalignment (dimensional tolerance) in the Z direction of the connector modules 10, the Z floating is performed on each of the connector modules 10 by a movement amount in accordance with the dimensional tolerance. Thus, when a certain connector module 10 shifts from the locked state (see FIG. 9A) to the unlocked state (see FIG. 9C), pressure by the spring 28A and the spring 28B of the connector module 10 that enters the unlocked state does not increase anymore (predetermined pressure is maintained) in order to bring different connector modules 10 that do not yet shift to the unlocked state closer to each other. In this way, the operator can collectively connect the plurality of ferrules that connect the high-density multicore optical fibers to each other with a smaller force than that with each optical connector in which the Z floating is not performed.

Situation during Removal of Optical Receptacle 2 and Optical Plug 3:

Next, a removal sequence of the optical receptacle 2 and the optical plug 3 will be described. The removal of the optical receptacle 2 and the optical plug 3 is performed in reverse order of the connection sequence of the optical receptacle 2 and the optical plug 3 described above.

The removal sequence of the optical receptacle 2 and the optical plug 3 can be performed by only one operation of loosening screwing of the receptacle-side cylindrical part 6 into the nut part 19. Hereinafter, the operation of loosening screwing of the receptacle-side cylindrical part 6 into the nut part 19 may be referred to as an "unscrewing operation". By this unscrewing operation, the receptacle-side connector module 11 and the plug-side connector module 12 move farther away from each other, and the connection is released. In this way, the operator who releases the connection between the optical receptacle 2 and the optical plug 3 can easily collectively release the connection of the plurality of ferrules that connect the high-density multicore optical fibers to each other only by performing a simple operation of the unscrewing operation.

Before Removal Stage 1 (Before Start of Unscrewing Operation)

Before a removal stage 1, that is, before screwing of the receptacle-side cylindrical part 6 into the nut part 19 is loosened, locking of the catch pawl part 16 by the movement regulation part 17 of the outer housing 13 (optical receptacle 2 side) is released, thereby leading to the unlocked state. Thus, the inner housing 14 can move in the Z direction with respect to the outer housing 13.

Removal Stage 1 (Locking of Outer Housing 13 and Inner Housing 14)

At the removal stage 1, the unlocking section 25 of the plug-side housing 23 (optical plug 3 side) is released from the state of elastically deforming the catch pawl part 16 of the inner housing 14 toward the receptacle-side ferrule 15A side (lower side in FIG. 9A). In other words, the catch pawl part 16 is locked again by the movement regulation part 17 of the outer housing 13 (optical receptacle 2 side). The outer housing 13 and the inner housing 14 enter the locked state again, and the movement of the inner housing 14 to the front side (opposite side to the plug side) with respect to the outer housing 13 is regulated. The regulation protrusion 33 of the inner housing 14 abuts the outer housing 13, and thus the inner housing 14 is prevented from exiting to the rear side (plug side) with respect to the outer housing 13.

Removal Stage 2 (Release of Fixing of Mechanical Reference Planes between Ferrule Endfaces)

At a removal stage 2, the engagement section 18 of the inner housing 14 is released from the engagement state with the engaged section 24 of the plug-side housing 23, the inner housing 14 and the plug-side housing 23 held in the predetermined positional relationship are separated, and fixing of the abutment surfaces (mechanical reference planes) of the endfaces between the receptacle-side ferrule 15A and the plug-side ferrule 15B is released. At this time, the rear abutment surface 31 (see FIG. 7) of the engaged section 24 of the plug-side housing 23 serves as a guide for releasing the engagement by butting against the engagement section 18. The spring 28A and the spring 28B deformed by the predetermined amount gradually return to the original length as the inner housing 14 and the plug-side housing 23 are separated.

Removal Stage 3 (Alignment Between Ferrule Endfaces)

At a connection stage 3, the abutment between the endfaces of the receptacle-side ferrule 15A and the plug-side ferrule 15B is released. Furthermore, fitting of the ferrule pin 26 and the ferrule hole 27 is released.

Removal Stage 4 and Removal Stage 5

At a connection stage 4, the contact between the plug-side housing 23 and the receptacle-side housing is released. Then, at a connection stage 5, screwing of the receptacle-side cylindrical part 6 into the nut part 19 is released. In this way, the removal sequence of the optical receptacle 2 and the optical plug 3 is completed.

In the embodiments described above, the high-density multicore optical connector when the 2000 optical fibers are connected is illustrated, but a high-density multicore optical connector when 1000 optical fibers are connected may be used, for example.

Figure 10A:
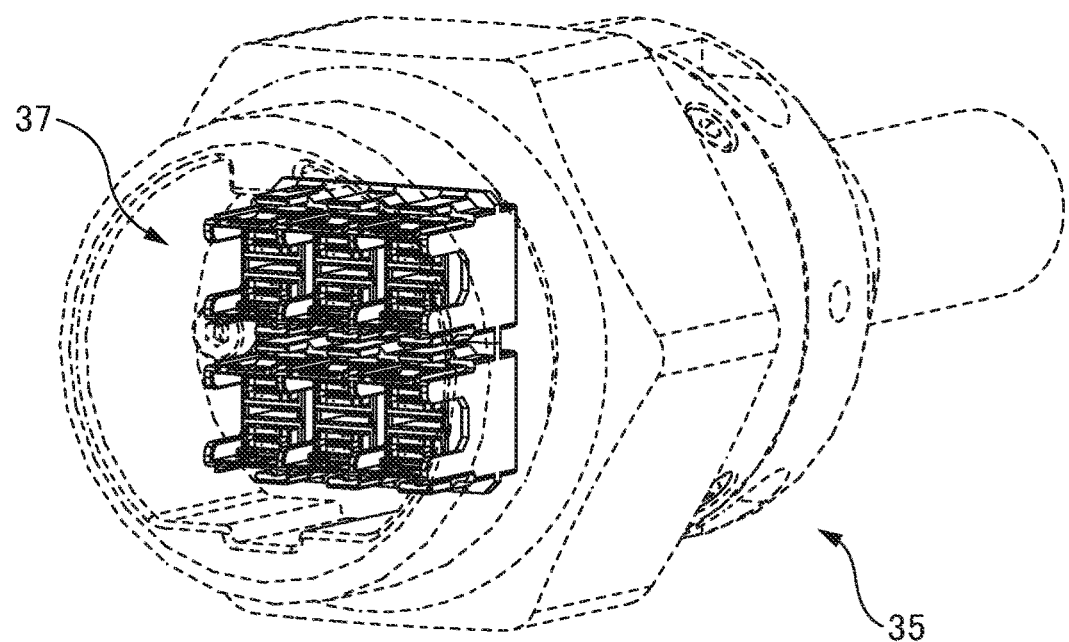
FIG. 10A is a perspective view of an enlarged part of a receptacle-side connector module 11 of an optical receptacle 2, in accordance with one or more embodiments.
Figure 10B:
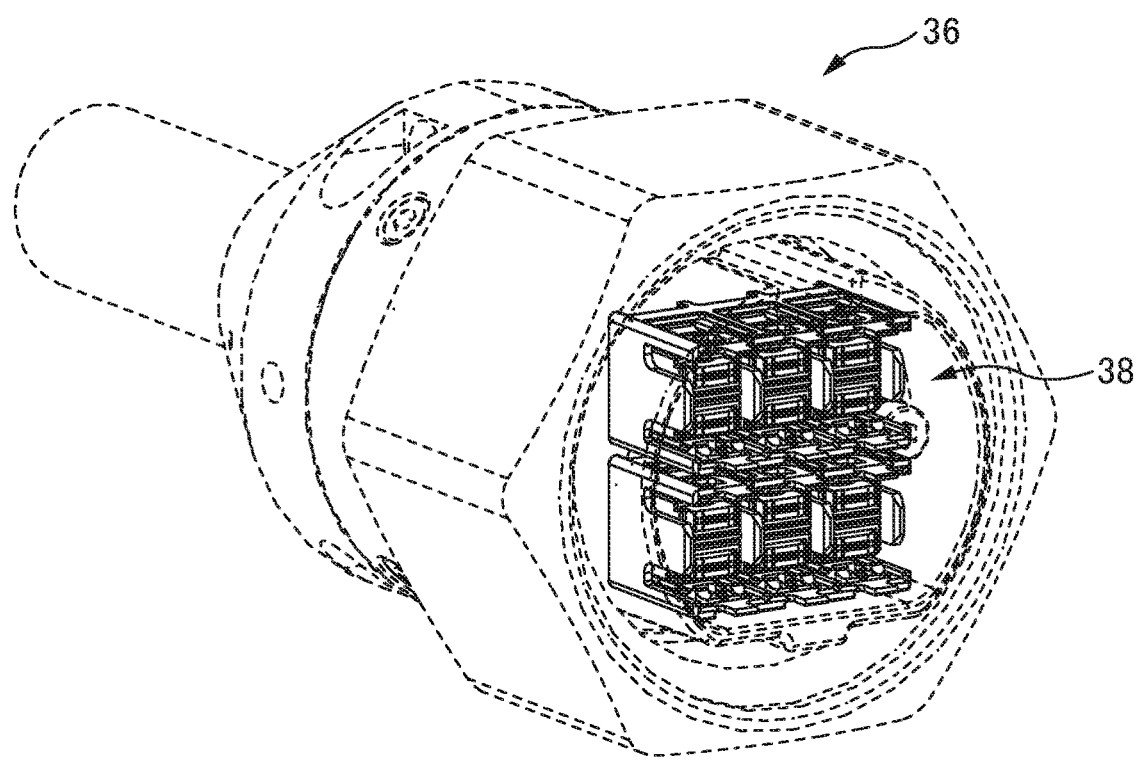
FIG. 10B is a perspective view of an enlarged part of a plug-side connector module 12 of an optical plug 3, in accordance with one or more embodiments.

FIG. 10A is a perspective view of an enlarged part of a receptacle-side connector module 37 of an optical receptacle 35. FIG. 10B is a perspective view of an enlarged part of a plug-side connector module 38 of an optical plug 36. The receptacle-side connector module 37 illustrated in FIG. 10A is a connector module on a receptacle side of an optical connector 34 that connects 1000 optical fibers. Three in the left-right direction and two in the up-down direction and a total of six receptacle-side connector modules 37 are arranged. The plug-side connector module 38 illustrated in FIG. 10B is a connector module on a plug side of the optical connector 34 that connects the 1000 optical fibers. Three in the left-right direction and two in the up-down direction and a total of six plug-side connector modules 38 are arranged.

The optical connector 34 is different from the optical connector 1 only in the number of the receptacle-side connector modules 37 and the plug-side connector modules 38 being arranged, and the arrangement direction and the other configurations except for the connector modules are the same as those of the optical connector 1.

In the optical connector 1 that connects the 2000 optical fibers described above and the optical connector 34 that connects the 1000 optical fibers, another way of arranging the connector modules may be used. For example, in the connector 1, three connector modules in the left-right direction and four connector modules in the up-down direction may be arranged, or 12 connector modules may be arranged radially.

In the embodiments described above, the optical receptacle 2 includes the receptacle-side cylindrical part 6 including the screw part formed on the outer surface, the optical plug 3 includes the nut part 19, and the optical receptacle 2 and the optical plug 3 are screwed. However, the optical receptacle 2 and the optical plug 3 may not include the screw part. For example, a bayonet mechanism adopted in a BNC connector may be formed instead of forming the screw part.

In the embodiments described above, the optical receptacle 2 includes the XY floating mechanism, but the optical receptacle 2 may not include the XY floating mechanism.

In the embodiments described above, the receptacle-side projection 9 is provided on the upper part of the receptacle-side cylindrical part 6 and the receptacle-side recess 8 is provided on the lower part thereof, but the receptacle-side projection 9 may be provided on the lower part of the receptacle-side cylindrical part 6 and the receptacle-side recess 8 may be provided on the upper part thereof. In this case, the plug-side projection 21 may be provided on the upper part of the plug-side cylindrical part 20, and the plug-side recess 22 may be provided on the lower part thereof.

In the embodiments described above, the flat part 7A is provided on the receptacle-side cylindrical part 6, but the flat part 7A may not be provided on the receptacle-side cylindrical part 6. Similarly, the flat part 7B may not be provided on the plug-side cylindrical part 20.

The foregoing embodiments are for facilitating the understanding of the present invention, and are not to be construed as limiting the present invention. The present invention may be modified and/or improved without departing from the gist thereof, and it goes without saying that the present invention encompasses any equivalents thereof.

REFERENCE SIGNS LIST

1: Optical connector;
2: Optical receptacle;
3: Optical plug;
4A, 4B: Optical fiber holding part;
5: Grip;
6: Receptacle-side cylindrical part;
7A, 7B: Flat part;
8: Receptacle-side recess;
9: Receptacle-side projection;
10: Connector module;
11: Receptacle-side connector module;
12: Plug-side connector module;
13: Outer housing;
14: Inner housing;
15A: Receptacle-side ferrule;
15B: Plug-side ferrule;
16: Catch pawl part;
17: Movement regulation part;
18: Engagement section;
19: Nut part;
20: Plug-side cylindrical part;
21: Plug-side projection;
22: Plug-side recess;
23: Plug-side housing;
24: Engaged section;
25: Unlocking section;
26: Ferrule pin;
27: Ferrule hole;
28A, 28B: Spring part;
29: Engagement guide part;
30: Front abutment surface;
31: Rear abutment surface;
32: Projecting part;
33: Regulation protrusion;
34: Optical connector;
35: Optical receptacle;
36: Optical plug;
37: Receptacle-side connector module;
38: Plug-side connector module.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:
1. An optical connector comprising:
an optical receptacle; and
an optical plug that is attachable to and detachable from the optical receptacle, wherein
the optical receptacle includes receptacle-side connector modules that each include:
an outer housing;
an inner housing;
a receptacle-side ferrule housed in the inner housing; and
a receptacle-side spring that applies pressure to the receptacle-side ferrule,
the optical plug includes plug-side connector modules that each include:
a plug-side housing;
a plug-side ferrule housed in the plug-side housing; and
a plug-side spring that applies pressure to the plug-side ferrule,
the inner housing includes an engagement section,
the plug-side housing includes an engaged section,
in a state where the engagement section engages with the engaged section, the inner housing and the plug-side housing have a predetermined positional relationship and the receptacle-side ferrule and the plug-side ferrule abut against each other with predetermined pressure by the receptacle-side spring and the plug-side spring,
the plug-side housing includes an unlocking section,
when the unlocking section causes a locked state where the inner housing is locked by the outer housing to shift to an unlocked state, the inner housing is movable with respect to the outer housing, and
when the optical receptacle and the optical plug are attached to one another and in a state where the engagement section engages with the engaged section after the locked state shifts to the unlocked state in each of a receptacle-side connector module and a plug-side connector module, the inner housing and the plug-side housing move in an attaching or detaching direction with respect to the outer housing,
the optical receptacle includes a receptacle-side cylindrical part with a screw disposed on an outer surface,
the optical plug includes a nut part into which the receptacle-side cylindrical part is screwed,
to shift from the unlocked state to the locked state a screwing of the receptacle-side cylindrical part into the nut part is loosened so that the engagement section is released from the engaged section.

2. The optical connector according to claim 1, wherein the locked state shifts to the unlocked state by advancing the screwing of the receptacle-side cylindrical part into the nut part.

3. The optical connector according to claim 2, wherein the optical plug further includes a plug-side cylindrical part that fits into the receptacle-side cylindrical part.

4. The optical connector according to claim 1, wherein the optical receptacle further includes a casing that holds the outer housing, and
the outer housing is movable in a direction perpendicular to an attaching and detaching direction with respect to the casing.

5. The optical connector according to claim 1, wherein the receptacle-side ferrule and the plug-side ferrule are a lens coupling-type ferrule.

6. The optical connector according to claim 1, wherein the optical plug further includes:
a plug-side cylindrical part that is housed in and fits into the receptacle-side cylindrical part during connection to the optical receptacle, and
a ring-shaped operation section that is rotatably disposed on an outer surface of the plug-side cylindrical part and that is screw-fixed to the receptacle-side cylindrical part by a screw disposed on an inner surface.

7. The optical connector according to claim 6, wherein an inside of the receptacle-side cylindrical part includes a first key projection that protrudes along an attaching and detaching direction and a first key recess having a groove shape along the attaching and detaching direction, and
an outside of the plug-side cylindrical part includes:
a second key recess that matches the first key projection and has a groove shape along the attaching and detaching direction, and
a second key projection that matches the first key recess and that protrudes along the attaching and detaching direction.

8. The optical connector according to claim 7, wherein the first key projection is positioned facing the first key recess.

9. The optical connector according to claim 7, wherein the first key recess is on a first flat part of a part of the inside of the receptacle-side cylindrical part, and
the second key projection is on a second flat part of a part of the plug-side cylindrical part.

10. The optical connector according to claim 6, wherein the optical receptacle further includes a casing that includes a grip and an optical fiber holding part,
the outer housing includes a pair of flange parts, and the grip and the optical fiber holding part hold the outer housing in the casing to sandwich the pair of flange parts.

11. The optical connector according to claim 10, wherein the grip and the ring-shaped operation section include a hexagonal-prism-shaped outer surface.

12. A method for connecting an optical connector including an optical receptacle and an optical plug that are attachable to and detachable from one another, wherein the optical receptacle includes receptacle-side connector modules that each includes: an outer housing; an inner housing; a receptacle-side ferrule housed in the inner housing; and a receptacle-side spring that applies pressure to the receptacle-side ferrule, the optical plug includes plug-side connector modules that includes: a plug-side housing; a plug-side ferrule housed in the plug-side housing; and a plug-side spring that applies pressure to the plug-side ferrule, the inner housing includes an engagement section, the plug-side housing includes an engaged section, in a state where the engagement section engages with the engaged section, the inner housing and the plug-side housing have a predetermined positional relationship and the receptacle-side ferrule and the plug-side ferrule abut against each other with predetermined pressure by the receptacle-side spring and the plug-side spring, and the plug-side housing includes an unlocking section, the method comprising:
attaching the optical plug to the optical receptacle;
detaching the optical plug from the optical receptacle;
moving the inner housing with respect to the outer housing by shifting a locked state where the inner housing is locked by the outer housing to an unlocked state using the unlocking section; and
when the optical receptacle and the optical plug are attached to one another and in a state where the engagement section engages with the engaged section after shifting the locked state to the unlocked state in each of receptacle-side connector modules and the plug-side connector modules, moving the inner housing and the plug-side housing an attaching and detaching direction with respect to the outer housing, wherein
the optical receptacle includes a receptacle-side cylindrical part with a screw disposed on an outer surface,
the optical plug includes a nut part into which the receptacle-side cylindrical part is screwed, and
to shift from the unlocked state to the locked state a screwing of the receptacle-side cylindrical part into the nut part is loosened so that the engagement section is released from the engaged section.

* * * * *